US011186667B2

(12) United States Patent
Kastelijn et al.

(10) Patent No.: US 11,186,667 B2
(45) Date of Patent: Nov. 30, 2021

(54) AQUEOUS BINDER COMPOSITION

(71) Applicant: COVESTRO (NETHERLANDS) B.V., Nieuwegein (NL)

(72) Inventors: Maud Kastelijn, Echt (NL); Tijs Nabuurs, Echt (NL)

(73) Assignee: COVESTRO (NETHERLANDS) B.V., Nieuwegein (NL)

( * ) Notice: Subject to any disclaimer, the term of this patent is extended or adjusted under 35 U.S.C. 154(b) by 37 days.

(21) Appl. No.: 16/629,746

(22) PCT Filed: Jul. 2, 2018

(86) PCT No.: PCT/EP2018/067796
§ 371 (c)(1),
(2) Date: Jan. 9, 2020

(87) PCT Pub. No.: WO2019/011693
PCT Pub. Date: Jan. 17, 2019

(65) Prior Publication Data
US 2021/0147594 A1 May 20, 2021

(30) Foreign Application Priority Data

Jul. 12, 2017 (EP) ..................... 17180959

(51) Int. Cl.
| | | |
|---|---|---|
| C08F 220/06 | (2006.01) | |
| C08F 2/22 | (2006.01) | |
| C08F 2/38 | (2006.01) | |
| C08F 220/14 | (2006.01) | |
| C08F 220/56 | (2006.01) | |
| C08K 5/372 | (2006.01) | |
| C08L 33/12 | (2006.01) | |

(Continued)

(52) U.S. Cl.
CPC ............. *C08F 220/06* (2013.01); *C08F 2/22* (2013.01); *C08F 2/38* (2013.01); *C08F 220/14* (2013.01); *C08F 220/1804* (2020.02); *C08F 220/56* (2013.01); *C08K 5/372* (2013.01); *C08L 33/12* (2013.01); *C09D 133/12* (2013.01); *C08F 2800/20* (2013.01); *C08L 2201/52* (2013.01); *C08L 2205/02* (2013.01)

(58) Field of Classification Search
CPC .... C08F 220/06; C08F 220/1804; C08F 2/22; C08F 2/38; C08F 220/14; C08F 220/56; C08F 2800/20; C08K 5/372; C08L 33/12; C08L 2201/52; C08L 2205/02; C09D 133/12
USPC ...................................................... 524/556
See application file for complete search history.

(56) References Cited

U.S. PATENT DOCUMENTS

| | | | | |
|---|---|---|---|---|
| 8,975,332 B2 * | 3/2015 | Mestach | ................... | C09D 7/80 524/745 |
| 9,505,943 B2 * | 11/2016 | Overbeek | ............ | C09D 133/12 |

FOREIGN PATENT DOCUMENTS

| | | |
|---|---|---|
| WO | 2012/084973 | 6/2012 |
| WO | 2012/140042 | 10/2012 |

OTHER PUBLICATIONS

International Search Report for PCT/EP2018/067796, dated Oct. 9, 2018, 3 pages.

(Continued)

*Primary Examiner* — Kelechi C Egwim
(74) *Attorney, Agent, or Firm* — Nixon & Vanderhye P.C.

(57) ABSTRACT

The current invention relates to a process for preparing an aqueous binder composition, the process comprising at least the following steps A) and B): A) preparing carboxylic acid-functional vinyl polymer (Polymer A) by emulsion polymerisation of a monomer composition A comprising the following monomers: Ai) at least one carboxylic acid functional olefinically unsaturated monomer; and Aii) at least one olefinically unsaturated monomer different than Ai); B) preparing vinyl polymer (Polymer B) by emulsion polymerization of a monomer composition B in the presence of Polymer A where the monomer composition B comprises the following monomer(s): Bi) at least one olefinically unsaturated monomer; Bii) optionally carboxylic acid functional olefinically unsaturated monomer different than Bi); where at least part of the carboxylic acid groups of Polymer A are deprotonated to obtain ionic or potentially ionic water-dispersing groups; where the acid value of Polymer B is lower than the acid value of Polymer A; where the weight average molecular weight (Mw) of Polymer B is higher than the weight average molecular weight (Mw) of Polymer A; where the glass transition temperature of Polymer B is equal to or lower than that of Polymer A; where the weight ratio of Polymer A to Polymer B is in the range of from 5:95 to 95:5; and whereby step A) comprises at least a first polymerisation stage of a monomer composition A1 effected in the presence of a chain transfer agent C1 having a water solubility of at least 5 g/L and a subsequent second polymerisation stage of a monomer composition A2 effected in the presence of a chain transfer agent C2 having a water solubility of at most 0.5 g/L, and whereby the second polymerisation stage of step A) is effected in the optional further presence of chain transfer agent C1 having a water solubility of at least 5 g/L whereby the concentration of chain transfer agent C1 having a water solubility of at least 5 g/L in the second polymerisation stage of step A) is at most 35 mole-%, relative to the total molar concentration of chain transfer agent C1 and chain transfer agent C2 present in the second polymerisation stage of step A).

38 Claims, 4 Drawing Sheets

(51) Int. Cl.
*C09D 133/12* (2006.01)
*C08F 220/18* (2006.01)

(56) References Cited

OTHER PUBLICATIONS

Written Opinion of the ISA for PCT/EP2018/067796, dated Oct. 9, 2018, 3 pages.

* cited by examiner

AQUEOUS BINDER COMPOSITION

CROSS-REFERENCE TO RELATED APPLICATIONS

This application is the U.S. national phase of International Application No. PCT/EP2018/067796 filed 2 Jul. 2018, which designated the U.S. and claims priority to EP Patent Application No. 17180959.3 filed 12 Jul. 2017, the entire contents of each of which are hereby incorporated by reference.

FIELD

The present invention relates to the field of acrylic polymer compositions especially those useful in the preparation of coatings. In particular, the present invention relates to aqueous binder compositions comprising polymer particles dispersed in an aqueous medium. The polymer particles comprise at least two vinyl polymers obtained by emulsion polymerisation and having different acid values and molecular weights, whereby the vinyl polymer with the higher molecular weight is obtained in the presence of the vinyl polymer with the lower molecular weight and whereby the vinyl polymer with the lower molecular weight has an acid value higher than the vinyl polymer with the higher molecular weight.

BACKGROUND AND SUMMARY

The use of aqueous binder compositions containing polymer emulsions that are colloidally stabilized using low molecular weight and acid containing polymers, also known as polyelectrolyte stabilized polymer emulsions, is well known in the coating market. Such aqueous binder compositions can for example suitably be used in waterborne printing inks used in the printing industry in view of the high reversibility. In the printing industry, reversibility (sometimes called redispersibility or resolubility) is an important property. Reversibility is a property, well known to the printing industry, whereby dry or drying polymer obtained from an aqueous polymer composition is redispersible or redissolvable in that same composition when the latter is applied thereto. Reversibility is of great importance in the process of printing which generally involves applying the waterborne ink-formulation by various cylinders (smooth, engraved or flexo diches); these can become blocked with polymer by evaporation of the water and other volatile organic compounds and/or the ink formulation can dry on the roller surface (e.g. during a short stoppage of the process for one reason or another) and this would obviously create problems when the process is restarted if the polymer were not reversible.

Aqueous binder compositions containing polymer emulsions that are colloidally stabilized using low molecular weight and acid containing polymers can also suitably be used to deliver coatings with high surface hardness whilst having a low minimum film forming temperature (good film forming ability at low temperature) in case the vinyl polymers with different molecular weight also have sufficiently different glass transition temperatures. In general, a good level of hardness (for which a high glass transition temperature polymer is required) and polymer flow (for which a low glass transition temperature polymer is required) are mutually exclusive properties. In case the difference in glass transition temperature between the at least two vinyl polymers is sufficiently high, the aqueous binder composition allows to obtain aqueous binder compositions which are film forming at low temperature and which are able to provide a coating with high surface hardness.

Such aqueous binder compositions are for example described in WO95/29963. WO95/29963 describes a process for preparing in situ a solvent-free aqueous crosslinkable polymer compositions by emulsion polymerization of a) a softer ($T_g$ 25° C. less than "oligomer" B) olefinic hydrophobic polymer A in the presence of b) a harder ($T_g$ 10 to 125° C.) acid-functional "oligomer" B having crosslinking groups thereon; and then c) crosslinking the mixture of high $T_g$ "oligomer" B and low $T_g$ polymer A to form a composition with Koenig hardness of >=40 seconds and minimum film forming temperature (MFFT) of <=55° C.

A disadvantage of aqueous binder compositions containing polymer emulsions that are colloidally stabilized using low molecular weight and acid containing polymers as for example described in WO95/29963 is the poor interaction with thickening agents, in particular associative thickening agents, which may result in a low low-shear viscosity and/or a slow build-up of the low-shear viscosity of the coating composition, resulting in that sagging may occur depending on the coating thickness, unless very high thickener concentrations are used. The layer thickness of the coating as well as the viscosity of the coating composition once applied will affect the sagging and conversely the sag resistance. The possibility of sagging increases with increasing coating layer thickness and with decreasing viscosity of the applied coating composition at low shear rates. Thus, one way to reduce sagging is successively applying of thinner coating layers. However, this is labour-intensive and time-consuming, in particular taking into account that prior to applying a successive layer the former layer needs to be sufficiently dry. Since a high viscosity of the applied coating composition is beneficial for promoting sag resistance, a high viscosity of the coating composition once it is applied (i.e. at low shear) and a rapid build-up of the low-shear viscosity are desired, in particular since this reduces the need for having to apply successive coating layers.

On the other hand, when applying a coating composition, a high viscosity of the coating composition is undesired since it will require more effort to apply the coating composition. Many coating applications are high-shear processes, such as for example brush, blade and in particular spray coating applications. Thus coating compositions with low high-shear viscosity, high low-shear viscosity and rapid build-up of the low-shear viscosity are highly desirable. However, due to the poor interaction with thickeners, in particular with associative thickeners, aqueous binder compositions containing polymer emulsions that are colloidally stabilized using low molecular weight and acid containing polymers are able to show the low viscosity at high shear, but also show too low viscosity at low shear. High thickening agent concentrations are not desired in view of costs, ease of formulation (i.e. it is desirable that the formulation of the coating composition is independent from the kind of binder composition) and/or increased water sensitivity of the dried films.

The object of the present invention is to provide aqueous binder compositions containing polymer emulsions that are colloidally stabilized using lower molecular weight and acid containing polymers, which are able to provide coating compositions having low viscosity at high shear, high viscosity at low shear and rapid build-up of the low-shear viscosity.

It has surprisingly been found that this object can be achieved with an aqueous binder composition obtained with a process comprising at least the following steps A) and B):
  A) preparing carboxylic acid-functional vinyl polymer (Polymer A) by emulsion polymerisation of a monomer composition A comprising the following monomers:
    Ai) at least one carboxylic acid functional olefinically unsaturated monomer; and
    Aii) at least one olefinically unsaturated monomer different than Ai);
  B) preparing vinyl polymer (Polymer B) by emulsion polymerization of a monomer composition B in the presence of Polymer A (prepared in step A)) where the monomer composition B comprises the following monomer(s):
    Bi) at least one olefinically unsaturated monomer;
    Bii) optionally carboxylic acid functional olefinically unsaturated monomer different than Bi);
where at least part of the carboxylic acid groups of Polymer A are deprotonated to obtain ionic or potentially ionic water-dispersing groups;
where the acid value of Polymer B is lower than the acid value of Polymer A;
where the weight average molecular weight (Mw) of Polymer B is higher than the weight average molecular weight (Mw) of Polymer A;
where the glass transition temperature of Polymer B is equal to or lower than that of Polymer A;
where the weight ratio of Polymer A to Polymer B is in the range of from 5:95 to 95:5; and
whereby step A) comprises at least a first polymerisation stage A1) and a subsequent second polymerisation stage A2), whereby the first polymerisation stage A1) of step A) is effected in the presence of a chain transfer agent C1 having a water solubility of at least 5 g/L and the second polymerisation stage A2) of step A) is effected in the presence of a chain transfer agent C2 having a water solubility of at most 0.5 g/L, and whereby the concentration of chain transfer agent C1 having a water solubility of at least 5 g/L in the second polymerisation stage A2) of step A) is at most 35 mole-%, relative to the total molar concentration of chain transfer agent C1 and chain transfer agent C2 present in the second polymerisation stage A2) of step A).

It has surprisingly been found that aqueous binder compositions obtained with the process according to the invention are able to provide coating compositions having low viscosity at high shear, high viscosity at low shear and rapid build-up of the low-shear viscosity.

DETAILED DESCRIPTION

Figure 1:
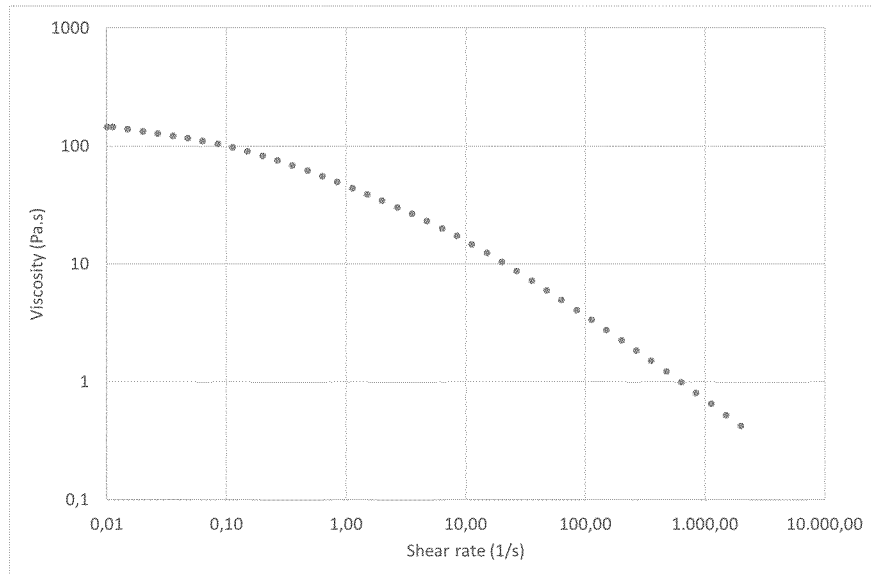
FIGS. 1-4 are viscosity versus shear rate plots for Formulations 1, 2, 3 and Comparative Formulation 4, respectively.
Figure 2:
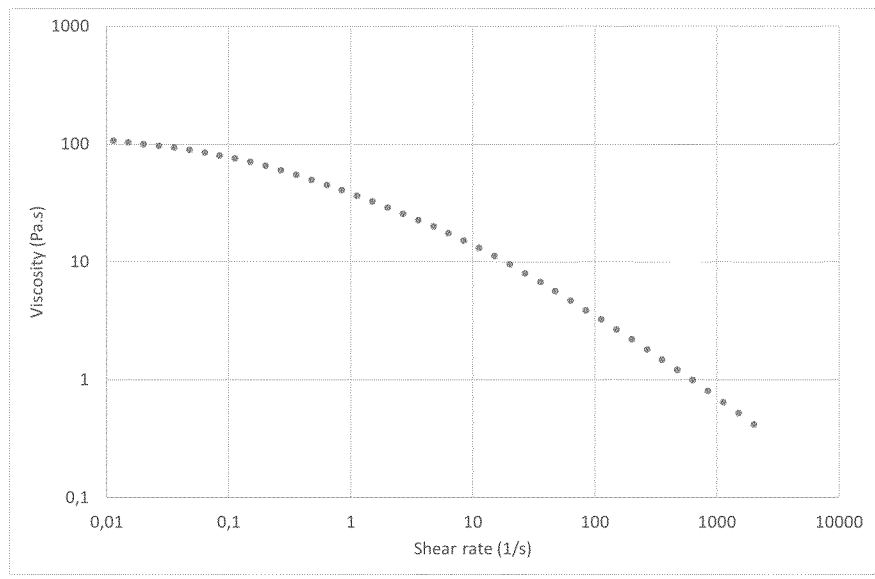
Figure 3:
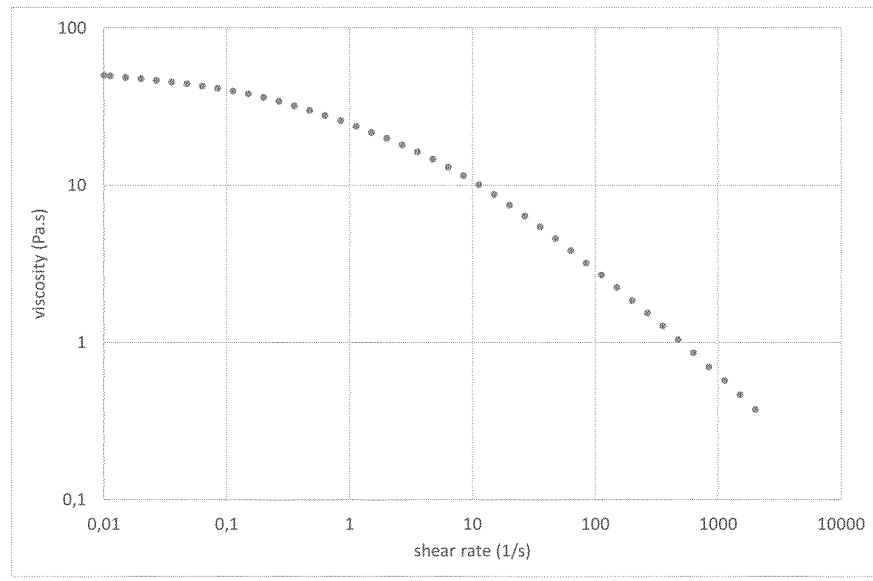
Figure 4:
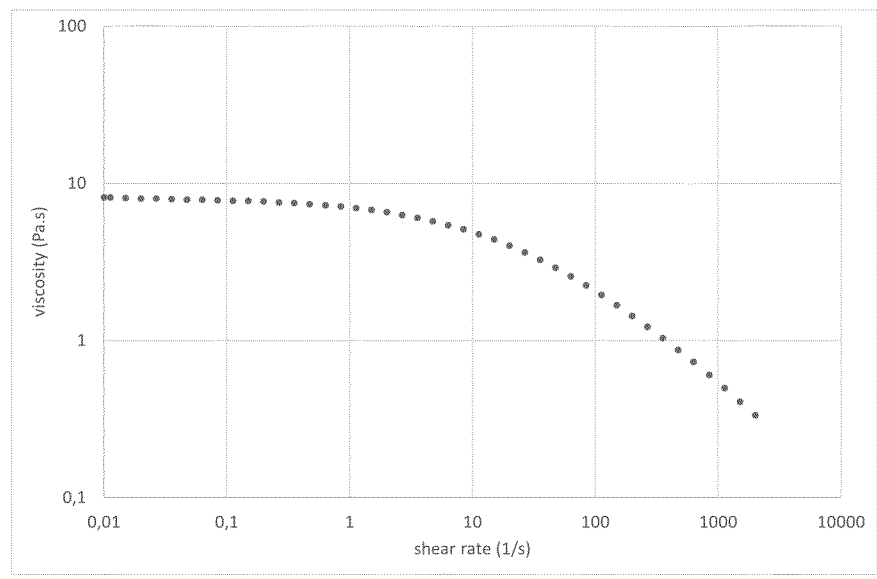

The present invention relates to a process for preparing an aqueous binder composition as described above and below.

Methods for preparing vinyl polymers by emulsion polymerization are known in the art and are described in for example Handbook Emulsion Polymerization: Theory and Practice, 1975, by D. C. Blackley (ISBN 978-0-85334-627-2). The preparation of vinyl polymers by means of multi-stage emulsion polymerization is also familiar to the skilled person, see further for example WO95/29963 and EP710680.

As used herein, the water solubility of the chain transfer agents C1 and C2 are determined using the method as described in "Group Contribution Methods to Estimate Water Solubility of Organic Chemicals" by R. Kühne, R.-U. Ebert, F. Kleint, G. Schmidt, and G. Schüürmann, published by Elsevier Science Ltd in Chemosphere, Vol. 30, No. 11, pages 2061-2077, 1995.

In the present invention, step A) is a sequential free-radical emulsion polymerisation process of monomer composition A in the presence of initiator and chain transfer agent. The sequential free-radical emulsion polymerisation process of step A) comprises at least two polymerisation stages, i.e. a first polymerisation stage A1) of a monomer composition A1 effected in the presence of a chain transfer agent C1 having a water solubility of at least 5 g/L and a subsequent second polymerisation stage A2) of a monomer composition A2 effected in the presence of a chain transfer agent C2 having a water solubility of at most 0.5 g/L. In the second polymerisation stage A2), the concentration of chain transfer agent C1 having a water solubility of at least 5 g/L is at most 35 mole-%, relative to the total molar concentration of chain transfer agent C1 and chain transfer agent C2 present in the second polymerisation stage A2) of step A).

Preferably, step A) consists of a first polymerisation stage A1) of a monomer composition A1 effected in the presence of a chain transfer agent C1 having a water solubility of at least 5 g/L and a subsequent second polymerisation stage A2) of a monomer composition A2 effected in the presence of a chain transfer agent C2 having a water solubility of at most 0.5 g/L, whereby the concentration of chain transfer agent C1 having a water solubility of at least 5 g/L in the second polymerisation stage A2) is at most 35 mole-%, relative to the total molar concentration of chain transfer agent C1 and chain transfer agent C2 present in the second polymerisation stage A2) of step A). The monomer composition A which is polymerised in the first polymerisation stage of step A) (also referred to as monomer composition A1) is preferably identical to the monomer composition A which is polymerised in the second polymerisation stage of step A) (also referred to as monomer composition A2).

The amount of chain transfer agent C1 added in the first polymerisation stage of step A) is preferably from 0.4 to 2.4 wt. % (relative to the monomer composition A1 charged in the first polymerisation stage A1) of step A)), more preferably from 0.4 to 1.3 wt. %. The chain transfer agent C1 is preferably selected from the group consisting of 3-mercaptopropionic acid (CAS number 107-96-0) having a water solubility of 188 g/L, 2-mercaptoethanol (CAS number 60-24-2) having a water solubility of 18.1 g/L and any mixture thereof. More preferably, the chain transfer agent C1 is 3-mercaptopropionic acid or 2-mercaptoethanol. Most preferably, the chain transfer agent C1 is 3-mercaptopropionic acid.

The amount of chain transfer agent C2 added in the second polymerisation stage of step A) is preferably from 0.4 to 3.0 wt. % (relative to the monomer composition A2 charged in the second stage A2) of step A)), more preferably from 1 to 2 wt. %. The chain transfer agent C2 is preferably selected from the group consisting of isooctyl thioglycolate (CAS number 25103-09-7) having a water solubility of $1.22 \cdot 10^{-2}$ g/L, lauryl mercaptan (CAS number 112-55-0) having a water solubility of $1.64 \cdot 10^{-3}$ g/L and any mixture thereof. More preferably, the chain transfer agent C2 is lauryl mercaptan or isooctyl thioglycolate. Most preferably, the chain transfer agent C2 is lauryl mercaptan.

The first polymerisation stage of step A) of the process of the present invention may be effected in the further presence of chain transfer agent C2 having a water solubility of at most 0.5 g/L. The amount of chain transfer agent C2 having a water solubility of at most 0.5 g/L added in the first polymerisation stage of step A) is preferably at most 75 mole-%, more preferably at most 50 mole-%, more preferably at most 25 mole-% and most preferably 0 mole-%, relative to the total molar concentration of chain transfer agent C1 and chain transfer agent C2 added in the first polymerisation stage of step A).

The second polymerisation stage of step A) of the process of the present invention may be effected in the further presence of chain transfer agent C1 having a water solubility of at least 5 g/L. The amount of chain transfer agent C1 having a water solubility of at least 5 g/L added in the second polymerisation stage of step A) is at most 35 mole-%, more preferably at most 10 mole-% and most preferably 0 mole-%, relative to the total molar concentration of chain transfer agent 01 and chain transfer agent C2 added in the second polymerisation stage of step A). The second polymerisation stage of step A) of the process of the present invention is preferably effected in the absence of chain transfer agent 01 having a water solubility of at least 5 g/L.

The weight ratio of the monomer composition A1 used in the first stage of step A) relative to the monomer composition A2 used in the second stage of step A) is preferably from 10:90 to 60:40. More preferably, the weight ratio of the monomer composition A1 used in the first stage of step A) relative to the monomer composition A2 used in the second stage of step A) is from 20:80 to 55:45.

The emulsion polymerization to obtain Polymer A and Polymer B is a free-radical emulsion polymerization that is conducted using appropriate heating and agitation (stirring). The free-radical emulsion polymerization is usually effected at atmospheric pressure and a temperature in the range from 30 to 100° C. Suitable free-radical-yielding initiators include persulphates such as ammonium, K and Na salts of persulphate, or redox initiator systems; combinations such as t-butyl hydroperoxide or hydrogen peroxide or cumene hydroperoxide, with isoascorbic acid or sodium formaldehydesulphoxylate, and optionally FeEDTA are useful. The amount of initiator, or initiator system, is generally 0.05 to 3 wt. % based on the weight of total monomers charged.

The monomer composition A1 used in the first polymerisation stage of step A) and the monomer composition A2 used in the second polymerisation stage of step A) comprise the following monomers:

Ai) at least one carboxylic acid functional olefinically unsaturated monomer; and Aii) at least one olefinically unsaturated monomer different than Ai).

Preferably the monomer composition A1 used in the first polymerisation stage of step A) comprises the following monomers:

Ai) from 5 to 15 wt. % of at least one carboxylic acid functional olefinically unsaturated monomer; and Aii) from 85 to 95 wt. % of at least one olefinically unsaturated monomer different than Ai); and Aiii) optionally at least one wet adhesion promoting olefinically unsaturated monomer different than Ai and Aii), in an amount of at most 6 wt. %; and Aiv) optionally at least one olefinically unsaturated monomer comprising crosslinkable groups, different than Ai), Aii) and Aiii), in an amount of at most 10 wt. %, whereby the amounts are given relative to the total weight of monomers charged in the first polymerisation stage of step A) and whereby the summed amount of Ai), Aii), Aiii) and Aiv) is 100 wt. %. The amount of Ai) is preferably chosen such that the acid value of Polymer A obtained in the first polymerisation stage of step A) is from 30 to 130 mg KOH/g of solid Polymer A, more preferably from 35 to 100 mg KOH/g of solid polymer A, more preferably from 40 to 100 mg KOH/g of solid polymer A and most preferably from 45 to 85 mg KOH/g of solid Polymer A. The acid value of Polymer A obtained in the first polymerisation stage of step A) is calculated based on the monomers and chain transfer agents charged in the first polymerisation stage of step A).

Preferably the monomer composition A2 used in the second polymerisation stage of step A) comprises the following monomers:

Ai) from 5 to 15 wt. % of at least one carboxylic acid functional olefinically unsaturated monomer; and Aii) from 85 to 95 wt. % of at least one olefinically unsaturated monomer different than Ai); and Aiii) optionally at least one wet adhesion promoting olefinically unsaturated monomer different than Ai and Aii), in an amount of at most 6 wt. %; and Aiv) optionally at least one olefinically unsaturated monomer comprising crosslinkable groups, different than Ai), Aii) and Aiii), in an amount of at most 10 wt. %, whereby the amounts are given relative to the total weight of monomers charged in the second polymerisation stage of step A) and whereby the summed amount of Ai), Aii), Aiii) and Aiv) is 100 wt. %. The amount of Ai) is preferably chosen such that the acid value of Polymer A obtained in the second polymerisation stage of step A) is from 30 to 130 mg KOH/g of solid Polymer A, more preferably from 35 to 100 mg KOH/g of solid polymer A, more preferably from 40 to 100 mg KOH/g of solid polymer A and most preferably from 45 to 85 mg KOH/g of solid Polymer A. The acid value of Polymer A obtained in the second polymerisation stage of step A) is calculated based on the monomers and chain transfer agents charged in the second polymerisation stage of step A). The acid value of Polymer A obtained in the first polymerisation stage of step A) is preferably identical to the acid value of Polymer A obtained in the second polymerisation stage of step A).

The glass transition temperature of Polymer A obtained in the first polymerisation stage of step A) and the glass transition temperature of Polymer A obtained in the second polymerisation stage of step A) is preferably from 50 to 150° C., more preferably from 80 to 150° C. and most preferably from 90 to 125° C. The glass transition temperature of Polymer A obtained in the first polymerisation stage of step A) is preferably identical to the glass transition temperature of Polymer A obtained in the second polymerisation stage of step A).

As used herein, the glass transition temperature is determined by calculation by means of the Fox equation. Thus, the $T_g$ in Kelvin, of a copolymer having "n" copolymerised comonomers is given by the weight fractions W of each comonomer type and the $T_g$'s of the homopolymers (in Kelvin) derived from each comonomer according to the equation:

$$Tg = 1/(\Sigma(W_n/Tg_n)$$

The calculated $T_g$ in Kelvin may be readily converted to ° C. If the hydrophobic vinyl Polymer B is a homopolymer, its $T_g$ is simply that of the polymerized monomer.

The vinyl polymer B is obtained by free-radical emulsion polymerization of a monomer composition B in the presence of Polymer A where the monomer composition B comprises the following monomer(s):
Bi) at least one olefinically unsaturated monomer;
Bii) optionally carboxylic acid functional olefinically unsaturated monomer different than Bi);
Biii) optionally wet adhesion promoting olefinically unsaturated monomer different than Bi) and Bii); and
Biv) optionally crosslinkable olefinically unsaturated monomer different than Bi), Bii) and Biii).

Preferably, the vinyl polymer B is obtained by free-radical emulsion polymerization of a monomer composition B in the presence of Polymer A where the monomer composition B comprises the following monomer(s):
Bi) from 87 to 100 wt. % of at least one olefinically unsaturated monomer;
Bii) optionally carboxylic acid functional olefinically unsaturated monomer, different than Bi), in an amount of at most 3 wt. %;
Biii) optionally olefinically unsaturated monomer with wet adhesion promoting groups, different than Bi) and Bii), in an amount of at most 5 wt. %; and
Biv) optionally olefinically unsaturated monomer comprising crosslinkable groups, different than Bi), Bii) and Biii), in an amount of at most 5 wt. %; whereby the amounts are given relative to the total weight of monomers charged in step B) of the process according to the invention and whereby the summed amount of Bi), Bii), Biii) and Biv) is 100 wt. %.

More preferably, the vinyl polymer B is obtained by free-radical emulsion polymerization of a monomer composition B in the presence of Polymer A where the monomer composition B comprises the following monomer(s):
Bi) from 92 to 100 wt. % of at least one olefinically unsaturated monomer;
Bii) optionally carboxylic acid functional olefinically unsaturated monomer, different than Bi), in an amount of at most 3 wt. %;
Biii) optionally olefinically unsaturated monomer with wet adhesion promoting groups, different than Bi) and Bii), in an amount of at most 2.5 wt. %; and
Biv) optionally olefinically unsaturated monomer comprising crosslinkable groups, different than Bi), Bii) and Biii), in an amount of at most 2.5 wt. %;
whereby the amounts are given relative to the total weight of monomers charged in step B) of the process according to the invention and whereby the summed amount of Bi), Bii), Biii) and Biv) is 100 wt. %.

The amount of Bii) is preferably chosen such that Polymer B has an acid value lower than 25 mg KOH/g of solid Polymer B, more preferably at most 10 mg KOH/g of solid Polymer B, more preferably less than 5 mg KOH/g of solid Polymer B, even more preferably Polymer B has an acid value of 0 mg KOH/g of solid Polymer B. The acid value of Polymer B is calculated based on the monomers and chain transfer agents charged in step B) of the process of the invention.

The glass transition temperature of Polymer B obtained in step B) is preferably from −50 to 50° C., more preferably from −50 to 35° C. and most preferably from −30 to 25° C. The glass transition temperature of Polymer B is preferably at least 30° C. lower than the glass transition temperature of Polymer A, more preferably at least 40° C. lower than the glass transition temperature of Polymer A.

Vinyl polymer A needs to contain sufficient water-dispersing groups to render the vinyl polymer A partially or fully soluble in an aqueous medium (i.e. at least part of the carboxylic groups of Polymer A are deprotonated to obtain ionic or potentially ionic water-dispersing groups) by neutralisation of at least a part of the carboxylic acid functional groups of Polymer A. As used herein, a potentially ionic water-dispersing group means a group which under the relevant conditions can be converted into an ionic group by salt formation. Neutralisation may be achieved for example by adjusting the pH of the aqueous medium. Suitable neutralising agents are bases, examples of which include organic bases such as alkyl amines (e.g. triethyl amine, tributyl amine), morpholine and alkanol amines, and inorganic bases, examples of which include ammonia, NaOH, KOH and LiOH. Preferably the base is selected from the group consisting of ammonia, dimethyl ethanol amine or a mixture thereof. Preferably the neutralization (the deprotonating) is effected following step A), i.e. before step B), during step B), or before and during step B). More preferably, the neutralization is effected before step B). Prior to the neutralization, polymer A is not water-soluble but dispersed in water at low pH levels of for example from 2 to 5. If base is added before, during or before and during step B), the hydrophilicity and water solubility of Polymer A increases successively in line with the increasing degree of neutralization of the acid groups. As the hydrophilicity and water solubility go up, the polymer of step A) is able to act increasingly as a protective colloid for polymer B and, toward the end of the polymerisation, to stabilize the polymer dispersion with high polymer solids content.

Surfactants can be utilised in order to assist in the dispersion of the vinyl polymer A and/or vinyl polymer B in water (even if vinyl polymer A is self-dispersible). Suitable surfactants include conventional anionic and/or non-ionic surfactants and mixtures thereof such as Na, K and $NH_4$ salts of dialkylsulphosuccinates, Na, K and $NH_4$ salts of sulphated oils, Na, K and $NH_4$ salts of alkyl sulphonic acids, Na, K and $NH_4$ alkyl sulphates, alkali metal salts of sulphonic acids; fatty alcohols, ethoxylated fatty acids and/or fatty amides, and Na, K and $NH_4$ salts of fatty acids such as Na stearate and Na oleate. Other anionic surfactants include alkyl or (alk)aryl groups linked to sulphonic acid groups, sulphuric acid half ester groups (linked in turn to polyglycol ether groups), phosphonic acid groups, phosphoric acid analogues and phosphates or carboxylic acid groups. Non-ionic surfactants include polyglycol ether compounds and preferably polyethylene oxide compounds as disclosed in "Non-Ionic Surfactants—Physical Chemistry" edited by M. J. Schick, M. Decker 1987. The amount of surfactant used is preferably 0.03 to 2% by weight based on the weight of vinyl polymer A and vinyl polymer B.

The carboxylic acid functional olefinically unsaturated monomers Ai) and, if present Bii), are preferably selected from the group consisting of acrylic acid, methacrylic acid, and R-carboxyethyl acrylate, citraconic acid, crotonic acid, fumaric acid, itaconic acid, monoalkyl esters of itaconic acid such as for example monomethyl itaconate, maleic acid, and potentially carboxylic acid functional olefinically unsaturated monomers such as itaconic anhydride or maleic anhydride, and combinations thereof; more preferably the carboxylic acid functional olefinically unsaturated monomer is acrylic acid, methacrylic acid, itaconic acid, fumaric acid and mixtures thereof. Most preferred carboxylic acid functional olefinically unsaturated monomer is methacrylic acid.

The monomers Aii) and Bi) are preferably selected from the group consisting of acrylates, methacrylates, arylalkylenes, dienes, vinyl esters, nitriles, olefinically unsaturated halides and any mixture thereof. Examples of suitable dienes are 1,3-butadiene and isoprene. An example of a suitable vinyl ester is vinyl acetate. Suitable arylalkylenes comprise (optionally hydrocarbo substituted) styrene and conveniently the optional hydrocarbo may be $C_{1-10}$hydrocarbyl, more conveniently $C_{1-4}$alkyl. Suitable arylalkylene monomers may be selected from: styrene, α-methyl styrene, vinyl toluene, t-butyl styrene, di-methyl styrene and/or mixtures thereof, especially styrene. Suitable nitriles are acrylonitrile and methacrylonitrile. Suitable olefinically unsaturated halides are vinyl chloride, vinylidene chloride and vinyl fluoride.

The monomers Aii) and Bi) are olefinically unsaturated monomers amenable for copolymerisation, but they do not include carboxylic acid functional olefinically unsaturated monomers (Ai). More preferably, the monomers Aii) and Bi) are selected from the group consisting of acrylates, methacrylates, arylalkylenes and any mixture thereof. Preferably the acrylate or methacrylate comprises hydrocarbo (meth) acrylate(s) and conveniently the hydrocarbo moiety may be $C_{1-20}$hydrocarbyl, more conveniently $C_{1-12}$alkyl, most conveniently $C_{1-10}$alkyl, for example $C_{1-8}$alkyl. Suitable (meth) acrylate(s) may be selected from: methyl (meth)acrylate, ethyl (meth)acrylate, 4-methyl-2-pentyl (meth) acrylate, 2-methylbutyl (meth) acrylate, isoamyl (meth)acrylate, sec-butyl (meth)acrylate, n-butyl (meth)acrylate, 2-ethylhexyl (meth)acrylate, lauryl (meth)acrylate, isodecyl (meth)acrylate, cyclohexyl (meth)acrylate and/or mixtures thereof.

Olefinically unsaturated monomers comprising crosslinkable groups (monomer Aiv) and monomer Biv)) are olefinically unsaturated monomers comprising functional groups for imparting crosslinkability when the aqueous binder composition is subsequently dried. The functional groups for providing crosslinkability are preferably selected from epoxy, hydroxyl, ketone and aldehyde groups. Comonomer(s) with functional groups (monomer Aiv) and monomer Biv)) for imparting crosslinkability is (are) preferably selected from glycidyl (meth)acrylate, hydroxyalkyl (meth)acrylates such as hydroxyethyl (meth)acrylate, acrolein, methacrolein and methyl vinyl ketone, the acetoacetoxy esters of hydroxyalkyl (meth)acrylates such as acetoacetoxyethyl (meth)acrylate, and keto-containing amides such as diacetone acrylamide. The functional group for providing crosslinkability is most preferably a ketone group. In case comonomer(s) with functional groups for imparting crosslinkability are applied in the present invention, the aqueous binder composition is preferably combined with a crosslinking agent (i.e. so that crosslinking takes place e.g. after the formation of a coating therefrom). For example, comonomer(s) with hydroxyl functional groups for imparting crosslinkability are used in combination with for example a polyisocyanate as crosslinking agent. Comonomer(s) with functional groups for imparting crosslinkability comprising ketone and/or aldehyde functional groups are used in combination with for example a polyamine or a polyhydrazide as crosslinking agent. An example of a suitable polyamine is isophorone diamine or a polyalkylene imine such as polyethylene imine, for example obtainable from BASF under the trade name Lupasol®. Examples of suitable polyhydrazides are adipic acid dihydrazide, oxalic acid dihydrazide, phthalic acid dihydrazide and terephthalic acid dihydrazide. A preferred polyhydrazide is adipic acid dihydrazide. A preferred combination of crosslinking agent and functional group for imparting crosslinkability when the aqueous binder composition is subsequently dried is the combination of adipic acid dihydrazide as crosslinking agent and at least one ketone group present in the comonomer with functional groups for imparting crosslinkability. Diacetone acrylamide (DAAM) is a preferred comonomer with ketone functional groups for use in combination with adipic acid dihydrazide. However, in one embodiment of the present invention advantageously the vinyl copolymer A and vinyl copolymer B present in the aqueous binder composition according to the present invention are substantially free of, more advantageously have no olefinically unsaturated monomers comprising crosslinkable groups.

Monomers which may further improve the wet adhesion (monomer Aiii) and Biii) may further be used. Conveniently further improved wet adhesion may be obtained by copolymerization of at least one monomer selected from the group consisting of:

i) ketone or acetoacetoxy functional olefinically unsaturated monomer [such as DAAM (diacetone acrylamide), AAEM (acetoacetoxy ethylmethacrylate) and/or mixtures thereof], ii) ureido functional olefinically unsaturated monomer, such as for instance those available commercially under the trade name Plex 6852-0, Evonik, combinations and/or mixtures thereof, iii) tertiary-amine functional olefinically unsaturated monomer [such as DMAEMA (dimethylamine ethylmethacrylate), and/or DMAEA (dimethylamine ethylacrylate)], and/or iv) any suitable combination of i), ii) and iii) and/or mixtures thereof.

However, in one embodiment of the present invention advantageously the vinyl copolymer A and vinyl copolymer B present in the aqueous binder composition according to the present invention are substantially free of, more advantageously have no, further wet adhesion promoting groups.

The solid/solid weight ratio of Polymer A to Polymer B is in the range of from 5:95 to 95:5. The solid/solid weight ratio of Polymer A to Polymer B is respectively preferably from 10 to 60 of A to from 40 to 90 of B, more preferably from 20 to 50 of A to from 50 to 80 of B; even more preferably from 23 to 35 of A to from 65 to 77 of B; and most preferably from 26 to 31 of A to from 69 to 74 of B.

In the present invention, the weight average molecular weight (Mw) of Polymer A is lower than the weight average molecular weight (Mw) of Polymer B.

The weight average molecular weight (Mw) is determined by SEC (Size Exclusion Chromatography) using three PLgel 10 µm Mixed-B columns at 70° C. on a Waters Alliance 2695 LC system with a Waters 2410 DRI detector and a Waters 2996 PDA detector. N-Methylpyrrolidone (NMP) with 8% v/v hexafluoroisopropanol (HFIP) and 10 mM lithiumbromide (LiBr) is used as eluent with a flow of 1 mL/min. The samples are dissolved in the eluent using a concentration of 5 mg polymer per mL solvent. The solubility is judged with a laser pen after 24 hours stabilization at room temperature; if any scattering is visible the samples are filtered first and 150 µl sample solution is injected. The number and weight average molecular weight results are calculated with 12 narrow polystyrene standards from 2017 to 1.700.000 Da.

The weight average molecular weight (Mw) of Polymer A is preferably less than 100.000 Dalton and higher than 2.000 Dalton. More preferably, the weight average molecular weight (Mw) of Polymer A is at least 5.000 Dalton. Even more preferably, the weight average molecular weight (Mw) of Polymer A is from 10.000 Dalton to 70.000 Dalton and most preferably the weight average molecular weight of Polymer A is from 15.000 to 70.000 Dalton.

The weight average molecular weight (Mw) of Polymer B is preferably at least 100.000 Dalton, preferably higher than 150.000 Dalton, more preferably higher than 200.000 Dalton.

The present invention further relates to aqueous binder composition obtainable or obtained by the process as described above.

The present invention further relates to an aqueous binder composition comprising polymer particles dispersed in an aqueous medium, wherein the polymer particles comprise, based on the weight of the polymer particles:
  (a) from 5 to 95 wt. % of an at least partly deprotonated carboxylic acid-functional vinyl polymer (Polymer A) with a glass transition temperature higher than 50° C. and comprising as polymerized units:
    Ai) at least partly deprotonated carboxylic acid functional olefinically unsaturated monomer(s), and
    Aii) olefinically unsaturated monomer(s) different than Ai); and
  (b) from 95 to 5 wt. % of vinyl Polymer B having a glass transition temperature equal to or lower than that of Polymer A and comprising as polymerized units;
    Bi) olefinically unsaturated monomer(s);
    Bii) optionally carboxylic acid functional olefinically unsaturated monomer(s) different than Bi);
where the weight average molecular weight (Mw) of Polymer B is higher than the weight average molecular weight (Mw) of Polymer A; and
where a part of Polymer A further comprises chain transfer agent C1 as functional end groups and a part of Polymer A comprises chain transfer agent C2 as functional end groups, whereby the water solubility of the chain transfer agent C1 is at least 5 g/L and the water solubility of the chain transfer agent C2 is at most 0.5 g/L.

The aqueous binder composition according to the invention or the aqueous binder composition obtained with the process according to the invention preferably has a total VOC level of less than 5000 ppm, more preferred less than 1000 ppm, and most preferred of less than 250 ppm.

Typically, the aqueous binder composition needs to be film forming at room temperature. For this purpose organic co-solvent may be needed. Preferably, the aqueous binder composition according to the invention requires less than 15 wt. % of organic co-solvent based on total composition for this purpose, more preferred less than 10 wt. %, even more preferred less than 5 wt. % and especially preferred 0 wt. % of organic co-solvent. The co-solvent may be used during the preparation of vinyl polymer A, vinyl polymer B or may be incorporated during the formulation of the aqueous binder composition. Preferably, the process for preparing the aqueous binder composition is effected in the absence of organic co-solvent. Preferably the total amount of polymer A and polymer B is at least 10 wt. %, preferably at least 15 wt. %, more preferably at least 20 wt. %, even more preferably at least 25 wt. %, even more preferably at least 90 wt. % and most preferably 100 wt. % (amount is given relative to the total amount of binders in the aqueous binder composition).

Thickening agents that can conveniently be used are preferably associative thickeners and more preferably combinations of associative and non-associative thickeners. Associative thickeners are preferably used in amount of 0.5 to 2.0 pbhp (weight parts by hundred weight parts) of binder. Non-associative thickeners are preferably used in amounts of 0.5 to 2.0 pbhp of binder. Associative and non-associative thickeners are preferably used in a ratio varying from 0.5 to 2 w/w. Examples of non-associative thickeners include cellulose derivatives such as cellulose ethers; hydrophobically modified hydroxy ethyl celluloses (HMHEC) and water-soluble polymers such as polyethylene oxides, polyvinyl alcohols, polyacrylamides and polyethyleneoxide based polyurethanes. Examples of associative thickeners include water soluble polymers, in particular hydrophobe modified water soluble polymers such as hydrophobically modified ethylene oxide urethane block copolymers (HEUR) and hydrophobically modified alkali soluble emulsions (HASE).

The present invention further relates to an aqueous coating composition comprising the aqueous binder composition as described above or comprising the aqueous binder composition obtainable or obtained with the process according to the invention and preferably further comprising at least one associative thickening agent in an amount of from 0.5 to 2.0 pbhp of binder. More preferably, the aqueous coating composition comprising the aqueous binder composition as described above or comprising the aqueous binder composition obtainable or obtained with the process according to the invention further comprises, next to the associative thickening agent(s), at least one non-associative thickening agent in an amount of from 0.5 to 2.0 pbhp of binder, where the weight ratio of associative thickener to non-associative thickener is preferably in the range of from 0.5 to 2. The aqueous coating composition according to the invention may further comprise solvents, pigments, dyes, heat stabilisers, defoamers, fillers, matting agents, UV absorbers and/or antioxidants. Non-limiting examples of coating compositions are paints; overprint varnishes for example for paper or film; film coatings such as for example printable substrates, barrier coatings, primers, protective coatings; and inks for example for flexo printing, gravure printing and inkjet printing.

The present invention further relates to a method of protective coating a substrate comprising the steps of applying the aqueous coating composition of the present invention to a substrate to form a coating thereon, and drying the coating to form a coated substrate. Preferably, applying the aqueous coating composition is carried out at high shear, for example by brushing, blading and in particular spraying The present invention is now illustrated by the following examples. Unless otherwise specified all parts, percentages, and ratios are on a weight basis.

Preparation of Polymer A.I

Preparation of an oligomer (Polymer A.I) comprising 0.6 wt-% of 3-MPA in the first phase and 1.2 wt-% of LM in the second phase, wherein the phase ratio is 50/50.

To a round-bottomed flask equipped with a stirrer, condenser, nitrogen adapter and a thermocouple are added 897.1 parts of demineralized water and 1.0 part of Aerosol GPG (70 wt-% in water). The reactor contents are heated to 85° C. Once a temperature of 80° C. is reached 20% of an emulsified first monomer feed, consisting of 47.5 parts of demineralized water, 1.5 parts of Aerosol GPG (70% in water), 11.2 parts of methacrylic acid, 151.7 parts of methyl methacrylate, 12.3 parts of butyl methacrylate, 11.2 parts of diacetone acrylamide, and 1.1 parts of 3-mercaptopropionic acid (3-MPA), is added to the reactor, followed by 30% of a solution of 1.1 parts of ammonium persulphate in 74.0 parts of demineralized water.

As soon as a reaction temperature of 85° C. is reached the remaining first monomer feed is added over a period of 40 minutes. Simultaneously, 50% of the remaining initiator solution is added over a period of 40 minutes. At the end of both feeds the monomer feed vessel is rinsed with 3.1 parts of demineralized water and the reactor contents are stirred at 85° C. for 30 minutes.

Next, a second emulsified monomer feed consisting of 47.5 parts of demineralized water, 1.5 parts of Aerosol GPG (70% in water), 11.2 parts of methacrylic acid, 151.7 parts of methyl methacrylate, 12.3 parts of butyl methacrylate, 11.2 parts of diacetone acrylamide, and 2.2 parts of lauryl mercaptane (LM) is added over a period of 40 minutes. Simultaneously, the remaining part of the initiator solution is added over a period of 40 minutes.

At the end of both feeds, the monomer feed vessel is rinsed with 7.7 parts of demineralized water and the reactor contents are again stirred for 30 minutes at 85° C. Next, the batch is cooled to 80° C. and a mixture of 21.0 parts of demineralized water and 21.0 parts of ammonia (25% solution in water) is added over a period of 15 minutes. The batch is stirred for another 20 minutes and cooled to room temperature. Solids content of Polymer A.I is corrected to 25% using demineralized water. The resulting emulsion has a solids content of 25.0%, and a pH of 9.1.

Preparation of Polymer A.II and Polymer A.III

The same process as described for Polymer A.I was followed, making use of components in amounts as given in Table 1.

Polymer A.II—Preparation of an oligomer comprising 0.8 wt-% of 3-MPA in the first phase and 0.8 wt-% of LM in the second phase, wherein the phase ratio is 50/50.

Polymer A.III—Preparation of an oligomer comprising 1.0 wt-% of 3-MPA in the first phase and 0.4 wt-% of LM in the second phase, wherein the phase ratio is 50/50.

TABLE 1

| | | Polymer A.II (parts) | Polymer A.III (parts) |
|---|---|---|---|
| Reactor contents | Demineralized water | 897.2 | 897.2 |
| | Aerosol GPG | 1.0 | 1.0 |
| Monomer feed 1 | Demineralized water | 47.5 | 47.5 |
| | Aerosol GPG | 1.5 | 1.5 |
| | Methacrylic acid | 11.2 | 11.2 |
| | Methyl methacrylate | 151.7 | 151.7 |
| | Butyl methacrylate | 12.3 | 12.3 |
| | Diacetone acrylamide | 11.2 | 11.2 |
| | 3-mercapto propionic acid | 1.5 | 1.9 |
| Initiator solution | Demineralized water | 74.0 | 74.0 |
| | Ammonium persulphate | 1.1 | 1.1 |
| Monomer feed 2 | Demineralized water | 47.5 | 47.5 |
| | Aerosol GPG | 1.5 | 1.5 |
| | Methacrylic acid | 11.2 | 11.2 |
| | Methyl methacrylate | 151.7 | 151.7 |
| | Butyl methacrylate | 12.3 | 12.3 |
| | Diacetone acrylamide | 11.2 | 11.2 |
| | Lauryl mercaptane | 1.5 | 0.8 |
| Neutralization | Demineralized water | 21.0 | 21.0 |
| | Ammonia (25 wt-%) | 21.0 | 21.0 |

Preparation of Polymer A.IV

Polymer A.IV—Preparation of an oligomer comprising 0.6 wt-% of 3-MPA and 1.2 wt-% of LM in a single monomer feed.

To a round-bottomed flask equipped with a stirrer, condenser, nitrogen adapter and a thermocouple are added 477.3 parts of demineralized water and 0.6 part of Aerosol GPG (70 wt-% in water). The reactor contents are heated to 85° C. Once a temperature of 80° C. is reached 10% of an emulsified monomer feed, consisting of 72.5 parts of demineralized water, 1.8 parts of Aerosol GPG (70% in water), 13.1 parts of methacrylic acid, 178.2 parts of methyl methacrylate, 14.5 parts of butyl methacrylate, 13.1 parts of diacetone acrylamide, 2.6 parts of lauryl mercaptane, and 1.3 parts of 3-mercaptopropionic acid, is added to the reactor, followed by 30% of a solution of 0.7 parts of ammonium persulphate in 43.5 parts of demineralized water. As soon as a reaction temperature of 85° C. is reached the remaining monomer feed is added over a period of 40 minutes. Simultaneously, the remaining initiator solution is added over a period of 40 minutes. At the end of both feeds the monomer feed vessel is rinsed with 6.3 parts of demineralized water and the reactor contents are stirred at 85° C. for 30 minutes. Next, the batch is cooled to 80° C. and a mixture of 12.4 parts of demineralized water and 12.4 parts of ammonia (25% solution in water) is added over a period of 15 minutes. The batch is stirred for another 20 minutes and cooled to room temperature. Solids content of Polymer A.IV is corrected to 25% using demineralized water. The resulting emulsion has a solids content of 25.0%, and a pH of 9.1.

Preparation of Polymer A.V and A.VI

The same process as described for Polymer A.IV was followed, making use of components in amounts as given in Table 2.

Polymer A.V—Preparation of an oligomer comprising 1.2 wt-% of LM.

Polymer A.VI—Preparation of an oligomer comprising 2.3 wt-% of LM.

TABLE 2

| | | Polymer A.V (parts) | Polymer A.VI (parts) |
|---|---|---|---|
| Reactor contents | Demineralized water | 477.7 | 477.7 |
| | Aerosol GPG | 0.6 | 0.6 |
| Monomer feed | Demineralized water | 30.6 | 30.6 |
| | Aerosol GPG | 1.8 | 1.8 |
| | Methacrylic acid | 13.1 | 13.1 |
| | Methyl methacrylate | 178.3 | 178.1 |
| | Butyl methacrylate | 14.5 | 14.5 |
| | Diacetone acrylamide | 13.2 | 13.1 |
| | Lauryl mercaptane | 2.6 | 5.0 |
| Initiator solution | Demineralized water | 43.5 | 43.5 |
| | Ammonium persulphate | 0.7 | 0.7 |
| Neutralization | Demineralized water | 11.4 | 11.4 |
| | Ammonia (25 wt-%) | 11.4 | 11.4 |

After 30 minutes of adding the monomer feeds for preparing Polymer A.V and Polymer A.VI, phase separation started to occur. At the end of the monomer feeds both emulsions gelled making it impossible to complete them nor could the Polymers A.V and A.VI be used as stabilizers in emulsion polymerization.

EXAMPLE 1—PREPARATION OF OLIGOMER-POLYMER EMULSION 1 USING POLYMER A.I AS STABILIZER

To a round-bottomed flask equipped with a stirrer, condenser, nitrogen adapter and a thermocouple are added 851.3 parts of Polymer A.I, and 17.4 parts of demineralized water. The reactor contents are heated to 60° C. At 60° C. 33.3% of a monomer mixture consisting of 38.7 parts of demineralized water, 294.4 parts of butyl methacrylate, 11.1 parts of diacetone acrylamide, and 248.9 parts of butyl acrylate is added. After mixing for 15 minutes 50% of an initiator mixture of 7.2 parts of demineralized water and 0.2 parts of t-butyl hydroperoxide (70 wt-% solution in water) is added, followed by 50% of a reductor solution of 12.6 parts of demineralized water, and 0.1 parts of iso-ascorbic acid, which is adjusted to pH=8.5 with ammonia (25% solution in water). After a peak temperature of approximately 80° C. is reached following an exothermic polymerization, the batch is stirred for 10 minutes at peak temperature. 88.5 parts of demineralized water is added and the batch is cooled to 60° C. 50% of the remaining monomer mixture is added, and the batch is stirred for another 15 minutes. 50% of the remaining initiator mixture is added, followed 50% of the remaining reductor solution. After reaching a peak temperature of approximately 75° C., the batch is stirred for 10 minutes at peak temperature. 88.5 parts of demineralized water are added and the batch is cooled to 60° C. The remaining parts of the monomer mixture are added after which the batch is again stirred for 15 minutes. The remaining parts of the initiator mixture is added, followed by the addition of the remaining reductor solution. After a peak temperature of approximately 70° C. is reached, the batch is stirred for 10 minutes while temperature is maintained at 70° C.

Next, a mixture of 0.1 parts of t-butyl hydroperoxide and 2.9 parts of demineralized water is added, followed by a solution of 0.1 parts of iso-ascorbic acid in 4.9 parts of demineralized water (which is adjusted to pH=8.5 using a 25% solution of ammonia in water). The batch is stirred at 70° C. for another 30 minutes, after which its contents are cooled to 60° C. At 60° C., a mixture of 11.1 parts of adipic dihydrazide and 34.2 parts of demineralized water are added, followed by 9.0 parts of Proxel Ultra 10. Solids content is checked and adjusted if necessary to 44% using demineralized water. The resulting emulsion has a solids content of 44.0%, a pH of 8.6, and a Brookfield viscosity of 150 mPa·s.

EXAMPLE 2—PREPARATION OF OLIGOMER-POLYMER EMULSION 2 USING POLYMER A.II AS STABILIZER

The same process as described for Example 1 was followed, replacing Polymer A.I with Polymer A.II.

EXAMPLE 3—PREPARATION OF OLIGOMER-POLYMER EMULSION 3 USING POLYMER A.III AS STABILIZER

The same process as described for Example 1 was followed, replacing Polymer A.I with Polymer A.III.

COMPARATIVE EXAMPLE 4—PREPARATION OF OLIGOMER-POLYMER EMULSIONS 4 USING POLYMER A.IV AS STABILIZER

The same process as described for Example 1 was followed, replacing Polymer A.I with Polymer A.IV.

Formulation of Oligomer-Polymer Emulsions

Examples 1, 2, and 3, as well as comparative example 4 were formulated with thickening agents according to the following recipe.

TABLE 3

|  | Form1 | Form2 | Form3 | Comp Form4 |
|---|---|---|---|---|
| Oligomer-polymer# | 1 | 2 | 3 | 4 |
|  | 73.10 g | 73.10 g | 73.10 g | 73.10 g |
| Demi water | 11.60 g | 11.60 g | 11.60 g | 11.60 g |
| Ethyldiglycol | 5.10 g | 5.10 g | 5.10 g | 5.10 g |

TABLE 3-continued

|  | Form1 | Form2 | Form3 | Comp Form4 |
|---|---|---|---|---|
| Tego Airex 902W (defoamer) | 1.50 g | 1.50 g | 1.50 g | 1.50 g |
| Aquaflow NMS-450 (associative thickener) | 0.80 g | 0.80 g | 0.80 g | 0.80 g |
| Aquaflow XLS-530 (associative thickener) | 0.83 g | 0.83 g | 0.83 g | 0.83 g |
| Demi water | 7.07 g | 7.07 g | 7.07 g | 7.07 g |

Results

In FIGS. 1, 2, 3 and 4 respectively, the viscosity versus shear rate plots are shown for the Formulations 1, 2, and 3, and Comparative Formulation 4 respectively.

It can be clearly seen in these Figures that while the viscosities at high shear rate are comparable, if not similar, the viscosities at low shear rate of the formulations according to the invention are an order of a magnitude or more higher than that of the reference shown in Comparative Formulation 4.

Figure 5:
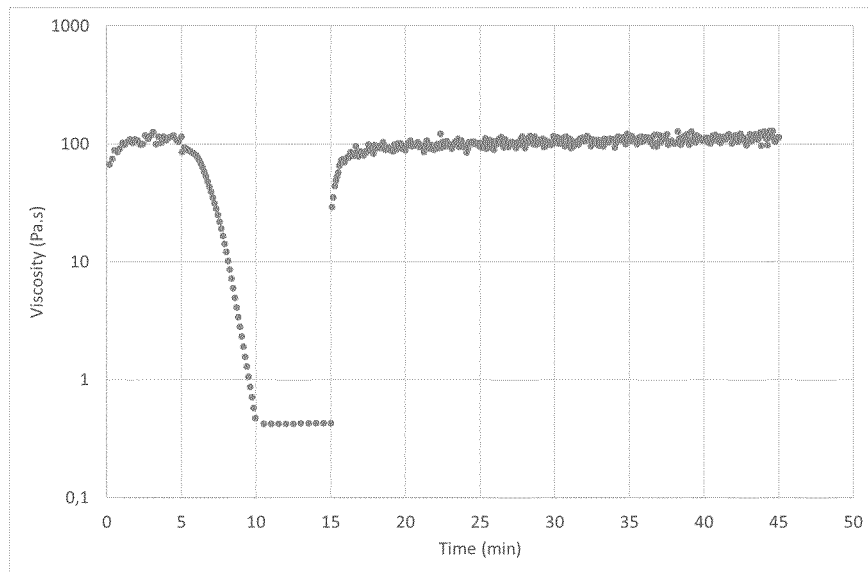
FIGS. 5-7 are viscosity versus time recovery plots for Formulations 1, 2 and Comparative Formulation 4, respectively.
Figure 6:
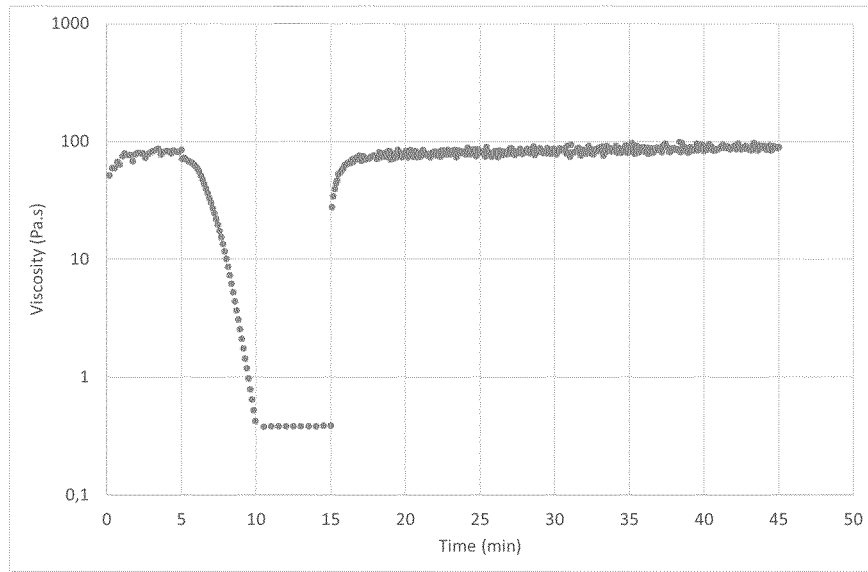
Figure 7:
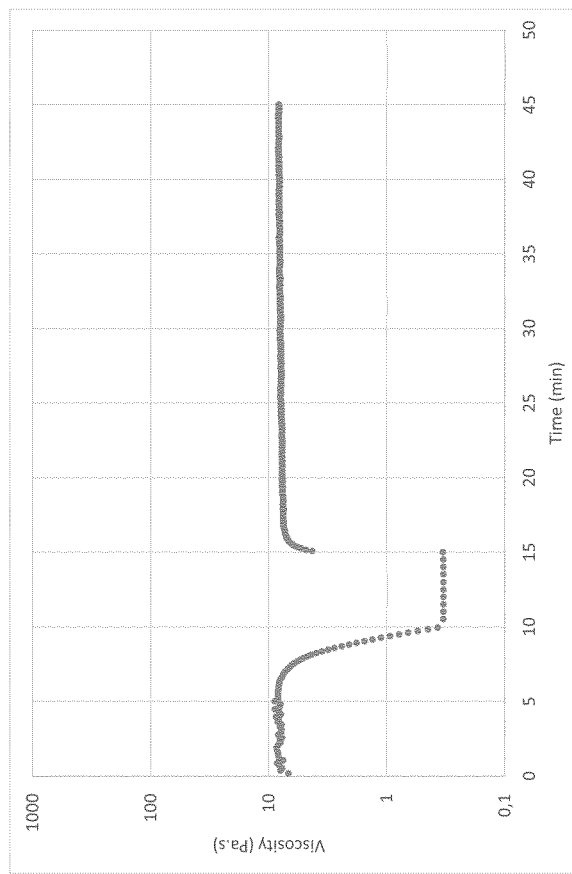

In FIGS. 5, 6 and 7 respectively, the viscosity recovery results are presented for Formulations 1, 2, and Comparative Formulation 4 respectively.

Samples of the formulations were stirred under the rheometer at a shear rate of 0.01 s$^{-1}$. After 5 minutes shear rate was increased to 10,000 s$^{-1}$. After 15 minutes, shear rate was again restored to 0.01 s$^{-1}$. During the entire experiment the viscosity was measured.

From these Figures, it can be concluded that the viscosity recovery after application of the high shear proceeds equally fast for the formulations according to the invention as for the reference formulation, even though the formulations according to the invention have to recover to higher values. In all cases, viscosity was entirely back at the original value within 2 minutes after stopping application of the high shear.

Preparation of Polymer A.VII

The same process as described for Polymer A.I was followed, making use of components in amounts as given in Table 4.

Preparation of an oligomer (Polymer A.VII) comprising 0.6 wt-% of 3-MPA in the first phase and 1.2 wt-% of LM in the second phase, wherein the phase ratio is 35/65

Preparation of Polymer A.VIII

The same process as described for Polymer A.I was followed, making use of components in amounts as given in Table 4.

Preparation of an oligomer (Polymer A.VIII) comprising 0.6 wt-% of 3-MPA in the first phase and 1.2 wt-% of LM in the second phase, wherein the phase ratio is 20/80

Preparation of Polymer A.IX

The same process as described for Polymer A.I was followed, making use of components in amounts as given in Table 4.

Preparation of an oligomer (Polymer A.IX) comprising 0.6 wt-% of 3-MPA in the first phase and 2.0 wt-% of LM in the second phase, wherein the phase ratio is 50/50.

TABLE 4

|  |  | Polymer A.VII (parts) | Polymer A.VIII (parts) | Polymer A.IX (parts) |
|---|---|---|---|---|
| Reactor contents | Demineralized water | 897.2 | 897.2 | 897.2 |
|  | Aerosol GPG | 1.0 | 1.0 | 1.0 |
| Monomer feed 1 | Demineralized water | 47.5 | 47.5 | 47.5 |
|  | Aerosol GPG | 1.5 | 1.5 | 1.5 |

TABLE 4-continued

|   |   | Polymer A.VII (parts) | Polymer A.VIII (parts) | Polymer A.IX (parts) |
|---|---|---|---|---|
|   | Methacrylic acid | 11.2 | 11.2 | 11.2 |
|   | Methyl methacrylate | 151.7 | 151.7 | 151.7 |
|   | Butyl methacrylate | 12.3 | 12.3 | 12.3 |
|   | Diacetone acrylamide | 11.2 | 11.2 | 11.2 |
|   | 3-mercapto propionic acid | 1.5 | 1.9 | 1.5 |
| Initiator solution | Demineralized water | 74.0 | 74.0 | 74.0 |
|   | Ammonium persulphate | 1.1 | 1.1 | 1.1 |
| Monomer feed 2 | Demineralized water | 47.5 | 47.5 | 47.5 |
|   | Aerosol GPG | 1.5 | 1.5 | 1.5 |
|   | Methacrylic acid | 11.2 | 11.2 | 11.2 |
|   | Methyl methacrylate | 151.7 | 151.7 | 151.7 |
|   | Butyl methacrylate | 12.3 | 12.3 | 12.3 |
|   | Diacetone acrylamide | 11.2 | 11.2 | 11.2 |
|   | Lauryl mercaptane | 1.5 | 0.8 | 1.5 |
| Neutralization | Demineralized water | 21.0 | 21.0 | 21.0 |
|   | Ammonia (25 wt-%) | 21.0 | 21.0 | 21.0 |

EXAMPLE 5—PREPARATION OF OLIGOMER-POLYMER EMULSION 5 USING POLYMER A.VII AS STABILIZER

The same process as described for Example 1 was followed, replacing Polymer A.I with Polymer A.VII.

EXAMPLE 6—PREPARATION OF OLIGOMER-POLYMER EMULSION 6 USING POLYMER A.VIII AS STABILIZER

The same process as described for Example 1 was followed, replacing Polymer A.I with Polymer A.VIII.

EXAMPLE 7—PREPARATION OF OLIGOMER-POLYMER EMULSION 7 USING POLYMER A.IX AS STABILIZER

The same process as described for Example 1 was followed, replacing Polymer A.I with Polymer A.IX.

Preparation of Polymer A.X

Preparation of an oligomer (Polymer A.X) comprising 0.6 wt-% of 2ME (2-mercaptoethanol) in the first phase and 1.6 wt-% of LM in the second phase, wherein the phase ratio is 50/50

The same process as described for Polymer A.I was followed, replacing 3-MPA with 2ME in the first phase and increasing the amount of LM in the second phase.

Preparation of Polymer A.XI

Preparation of an oligomer (Polymer A.XI) comprising 0.6 wt-% of 2-ME in the first phase and 1.2 wt-% of iOTG in the second phase, wherein the phase ratio is 50/50 The same process as described for Polymer A.I was followed, replacing 3-MPA with 2ME and replacing LM with iOTG.

Preparation of Polymer A.XII

Preparation of an oligomer (Polymer A.XII) comprising 0.6 wt-% of 3-MPA in the first phase and a combination of 0.2 wt-% of 3-MPA and 0.8 wt-% of LM in the second phase, wherein the phase ratio is 50/50. The same process as described for Polymer A.I was followed, replacing LM with 3-MPA and LM in the amounts as given above. Hence, the concentration of chain transfer agent C1 (3-MPA) in the second polymerisation stage of the preparation of polymer A.XII is 31 mole-% (relative to the total molar concentration of chain transfer agent C1 and chain transfer agent C2 (LM) present in the second polymerisation stage of the preparation of polymer A.XII).

EXAMPLE 8—PREPARATION OF OLIGOMER-POLYMER EMULSION 8 USING POLYMER A.X AS STABILIZER

The same process as described for Example 1 was followed, replacing Polymer A.I with Polymer A.X.

EXAMPLE 9—PREPARATION OF OLIGOMER-POLYMER EMULSION 9 USING POLYMER A.XI AS STABILIZER

The same process as described for Example 1 was followed, replacing Polymer A.I with Polymer A.XI.

EXAMPLE 10—PREPARATION OF OLIGOMER-POLYMER EMULSION 10 USING POLYMER A.XII AS STABILIZER

The same process as described for Example 1 was followed, replacing Polymer A.I with Polymer A.XII.

Preparation of Polymer A.XIII.

Preparation of an oligomer (Polymer A.XIII) comprising 10 wt-% of methacrylic acid and 2.4 wt-% of 3-MPA in a single monomer feed.

To a round-bottomed flask equipped with a stirrer, condenser, nitrogen adapter and a thermocouple are added 534.2 parts of demineralized water and 0.7 parts of Aerosol GPG (70 wt-% in water). The reactor contents are heated to 85° C. Once a temperature of 80° C. is reached 10% of an emulsified monomer feed, consisting of 99.6 parts of demineralized water, 1.9 parts of Aerosol GPG (70% in water), 24.1 parts of methacrylic acid, 178.0 parts of methyl methacrylate, 24.1 parts of butyl methacrylate, 14.4 parts of diacetone acrylamide, and 5.8 parts of 3-mercaptopropionic acid, is added to the reactor, followed by a solution of 0.2 parts of ammonium persulphate in 10.9 parts of demineralized water.

As soon as a reaction temperature of 85° C. is reached the remaining monomer feed is added over a period of 60 minutes. Simultaneously, an initiator solution, consisting of 0.5 parts of ammonium persulphate and 33.2 parts of demineralized water, is added over a period of 60 minutes. At the end of both feeds the monomer feed vessel is rinsed with 10.0 parts of demineralized water and the reactor contents are stirred at 85° C. for 30 minutes.

Next, the batch is cooled to 80° C. and a mixture of 19.2 parts of demineralized water and 19.2 parts of ammonia (25% solution in water) is added over a period of 15 minutes. The batch is stirred for another 20 minutes and cooled to room temperature. Solids content of Polymer A.XIII is corrected to 25% using demineralized water. The resulting emulsion has a solids content of 25.0%, and a pH of 8.5.

Preparation of Polymer A.XIV

Preparation of an oligomer (Polymer A.XIV) comprising 10 wt-% of methacrylic acid and 1.2 wt-% of 3-MPA in the first phase and 2.4 wt-% of LM in the second phase, wherein the phase ratio is 50/50.

To a round-bottomed flask equipped with a stirrer, condenser, nitrogen adapter and a thermocouple are added 897.1 parts of demineralized water and 1.0 part of Aerosol GPG (70 wt-% in water). The reactor contents are heated to 85° C. Once a temperature of 80° C. is reached 20% of an emulsified first monomer feed, consisting of 47.5 parts of demineralized water, 1.5 parts of Aerosol GPG (70% in water), 18.6 parts of methacrylic acid, 144.2 parts of methyl methacrylate, 12.3 parts of butyl methacrylate, 11.2 parts of diacetone acrylamide, and 2.2 parts of 3-mercaptopropionic acid, is added to the reactor, followed by 30% of a solution of 1.1 parts of ammonium persulphate in 74.0 parts of demineralized water.

As soon as a reaction temperature of 85° C. is reached the remaining first monomer feed is added over a period of 40 minutes. Simultaneously, 50% of the remaining initiator solution is added over a period of 40 minutes. At the end of both feeds the monomer feed vessel is rinsed with 3.1 parts of demineralized water and the reactor contents are stirred at 85° C. for 30 minutes.

Next, a second emulsified monomer feed consisting of 47.5 parts of demineralized water, 1.5 parts of Aerosol GPG (70% in water), 18.6 parts of methacrylic acid, 144.2 parts of methyl methacrylate, 12.3 parts of butyl methacrylate, 11.2 parts of diacetone acrylamide, and 4.5 parts of lauryl mercaptane is added over a period of 40 minutes. Simultaneously, the remaining part of the initiator solution is added over a period of 40 minutes.

At the end of both feeds, the monomer feed vessel is rinsed with 7.7 parts of demineralized water and the reactor contents are again stirred for 30 minutes at 85° C. Next, the batch is cooled to 80° C. and a mixture of 21.0 parts of demineralized water and 21.0 parts of ammonia (25% solution in water) is added over a period of 15 minutes. The batch is stirred for another 20 minutes and cooled to room temperature. Solids content of Polymer A.I was corrected to 25% using demineralized water. The resulting emulsion has a solids content of 25.0%, and a pH of 8.6.

COMPARATIVE EXAMPLE 11—PREPARATION OF OLIGOMER-POLYMER EMULSION 11 USING POLYMER A.XIII AS STABILIZER

To a round-bottomed flask equipped with a stirrer, condenser, nitrogen adapter and a thermocouple are added 851.3 parts of Polymer A.XIII, and 17.4 parts of demineralized water. The reactor contents are heated to 60° C. At 60° C. 33.3% of a monomer mixture consisting of 38.7 parts of demineralized water, 294.4 parts of butyl methacrylate, 11.1 parts of diacetone acrylamide, and 248.9 parts of butyl acrylate is added. After mixing for 15 minutes 50% of an initiator mixture of 7.2 parts of demineralized water and 0.2 parts of t-butyl hydroperoxide (70 wt-% solution in water) is added, followed by 50% of a reductor solution of 12.6 parts of demineralized water, and 0.1 parts of iso-ascorbic acid, which is adjusted to pH=8.5 with ammonia (25% solution in water). After a peak temperature of approximately 80° C. is reached following an exothermic polymerization, the batch is stirred for 10 minutes at peak temperature. 88.5 parts of demineralized water is added and the batch is cooled to 60° C. 50% of the remaining monomer mixture is added, and the batch is stirred for another 15 minutes. 50% of the remaining initiator mixture is added, followed 50% of the remaining reductor solution. After reaching a peak temperature of approximately 75° C., the batch is stirred for 10 minutes at peak temperature. 88.5 parts of demineralized water are added and the batch is cooled to 60° C. The remaining parts of the monomer mixture are added after which the batch is again stirred for 15 minutes. The remaining parts of the initiator mixture is added, followed by the addition of the remaining reductor solution. After a peak temperature of approximately 70° C. is reached, the batch is stirred for 10 minutes while temperature is maintained at 70° C.

Next, a mixture of 0.1 parts of t-butyl hydroperoxide and 2.9 parts of demineralized water is added, followed by a solution of 0.1 parts of iso-ascorbic acid in 4.9 parts of demineralized water (which is adjusted to pH=8.5 using a 25% solution of ammonia in water). The batch is stirred at 70° C. for another 30 minutes, after which its contents are cooled to 60° C. At 60° C., a mixture of 11.1 parts of adipic dihydrazide and 34.2 parts of demineralized water are added, followed by 9.0 parts of Proxel Ultra 10. Solids content is checked and adjusted if necessary to 44% using demineralized water. The resulting emulsion has a solids content of 44.0%, a pH of 8.3, and a Brookfield viscosity of 110 mPa·s.

EXAMPLE 12—PREPARATION OF OLIGOMER-POLYMER EMULSION 12 USING POLYMER A.XIV AS STABILIZER

The same process as described for Comparative Example 11 was followed, replacing Polymer A.XIII with Polymer A.XIV.

Preparation of Polymer A.XV

Preparation of an oligomer comprising 0.6 wt-% of iOTG in the first phase and 1.2 wt-% of LM in the second phase, wherein the phase ratio is 50/50 The same process as described for Polymer A.I was followed, replacing 3-MPA with iOTG. Just as was observed for Polymer A.V and Polymer A.VI, after 30 minutes of adding the first monomer feed phase separation started to occur. At the end of the first monomer feed the emulsion gelled making it impossible to complete it nor could Polymers A.XV be used as stabilizer in emulsion polymerization.

Preparation of Polymer A.XVI

Preparation of an oligomer (Polymer A.XVI) comprising 0.6 wt-% of 3MPA in the first phase and a combination of 0.4 wt-% of 3MPA and 0.4 wt-% of LM in the second phase, wherein the phase ratio is 50/50. The same process as described for Polymer A.I was followed, replacing 2.2 parts of LM in the second monomer feed with 0.7 parts of 3MPA and 0.7 parts of LM.

Hence, the concentration of chain transfer agent C1 (3-MPA) in the second polymerisation stage of the preparation of polymer A.XVI is 66 mole-% (relative to the total molar concentration of chain transfer agent C1 and chain transfer agent C2 (LM) present in the second polymerisation stage of the preparation of polymer A.XVI).

Preparation of Polymer A.XVII

Preparation of an oligomer (Polymer A.XVII) comprising 0.6 wt-% of 3MPA in the first phase and 0.6 wt-% of 2ME in the second phase, wherein the phase ratio is 50/50 The same process as described for Polymer A.I was followed, replacing 2.2 parts of LM in the second monomer feed with 1.1 parts of 2ME.

COMPARATIVE EXAMPLE 13—PREPARATION OF OLIGOMER-POLYMER EMULSION 13 USING POLYMER A.XVI AS STABILIZER

A process similar to that as described in Example 1, replacing Polymer A.I with Polymer A.XVI.

COMPARATIVE EXAMPLE 14—PREPARATION OF OLIGOMER-POLYMER EMULSION 14 USING POLYMER A.XVII AS STABILIZER

A process similar to that as described in Example 1, replacing Polymer A.I with Polymer A.XVII.

The examples according to the invention and the comparative examples are formulated using the following recipe.

TABLE 5

| | Form# |
|---|---|
| Oligomer-polymer# | 73.10 g |
| Demi water | 11.60 g |
| Ethyldiglycol | 5.10 g |
| Tego Airex 902W | 1.50 g |
| Aquaflow NMS-450 | 0.80 g |
| Aquaflow XLS-530 | 0.83 g |
| Demi water | 7.07 g |

In the following table the results are shown, where the viscosity at a shear rate of 0.01 s$^{-1}$ and the viscosity at 10,000 s$^{-1}$ are shown.

TABLE 6

| Form# | Oligomer-polymer# | Polymer A# | Viscosity @ 0.01 s$^{-1}$ | Viscosity @ 10,000 s$^{-1}$ |
|---|---|---|---|---|
| 1 | 1 | A.I | 145.8 | 0.41 |
| 2 | 2 | A.II | 107.7 | 0.42 |
| 3 | 3 | A.III | 56.0 | 0.38 |
| C4 | 4 | A.IV | 10.3 | 0.35 |
| 5 | 5 | A.VII | 45.2 | 0.30 |
| 6 | 6 | A.VIII | 46.0 | 0.31 |
| 7 | 7 | A.IX | 83.7 | 0.31 |
| 8 | 8 | A.X | 51.0 | 0.34 |
| 9 | 9 | A.XI | 38.2 | 0.36 |
| 10 | 10 | A.XII | 30.8 | 0.39 |
| C11 | 11 | A.XIII | 7.2 | 0.42 |
| 12 | 12 | A.XIV | 60.5 | 0.47 |
| C13 | 13 | A.XVI | 6.6 | 0.38 |
| C14 | 14 | A.XVII | 10.1 | 0.46 |

From the above, it can be concluded that by using an oligomer prepared via a sequential process, where the first feed contains a hydrophilic chain transfer agent and the second feed contains a hydrophobic chain transfer agent, as stabilizers for oligomer-polymer emulsions significantly better interaction with thickeners can be obtained than when a single phase oligomer is used with both chain transfer agents used simultaneously (Comp. Ex 4), or than when a single phase oligomer is used prepared with only hydrophilic chain transfer agent (Comp. Ex 11), or that when a sequential phase oligomer is used prepared with only hydrophilic chain transfer agent (Comp. Ex 14), or that when a sequential phase oligomer is used where the first feed contains a hydrophilic chain transfer agent and the second feed contains a hydrophobic chain transfer agent and more than 35 mole-% of hydrophilic chain transfer agent (Comp. Ex 13).

The invention claimed is:

1. A process for preparing an aqueous binder composition, the process comprising at least the following steps A) and B):
A) preparing carboxylic acid-functional vinyl polymer (Polymer A) by emulsion polymerisation of a monomer composition A comprising the following monomers:
  Ai) at least one carboxylic acid functional olefinically unsaturated monomer; and
  Aii) at least one olefinically unsaturated monomer different than Ai);
B) preparing vinyl polymer (Polymer B) by emulsion polymerization of a monomer composition B in the presence of Polymer A where the monomer composition B comprises the following monomer(s):
  Bi) at least one olefinically unsaturated monomer;
  Bii) optionally carboxylic acid functional olefinically unsaturated monomer different than Bi); wherein at least part of the carboxylic acid groups of Polymer A are deprotonated to obtain ionic or potentially ionic water-dispersing groups; wherein
the acid value of Polymer B is lower than the acid value of Polymer A; wherein
the weight average molecular weight (Mw) of Polymer B is higher than the weight average molecular weight (Mw) of Polymer A; wherein
the glass transition temperature of Polymer B is equal to or lower than that of Polymer A; wherein
the weight ratio of Polymer A to Polymer B is in the range of from 5:95 to 95:5; and wherein
step A) comprises at least a first polymerisation stage of a monomer composition A1 effected in the presence of a chain transfer agent C1 having a water solubility of at least 5 g/L and a subsequent second polymerisation stage of a monomer composition A2 effected in the presence of a chain transfer agent C2 having a water solubility of at most 0.5 g/L, and wherein
the second polymerisation stage of step A) is effected in the optional further presence of chain transfer agent C1 having a water solubility of at least 5 g/L wherein the concentration of chain transfer agent C1 having a water solubility of at least 5 g/L in the second polymerisation stage of step A) is at most 35 mole-%, relative to the total molar concentration of chain transfer agent C1 and chain transfer agent C2 present in the second polymerisation stage of step A).

2. The process according to claim 1, wherein the concentration of chain transfer agent C1 in the first polymerisation stage of step A) is from 0.4 to 2.4 wt.%, relative to the monomer composition A1 charged in the first stage of step A.

3. The process according to claim 1, wherein the concentration of chain transfer agent C2 in the second polymerisation stage of step A) is from 0.4 to 3 wt.%, relative to the monomer composition A2 charged in the second stage of step A.

4. The process according to claim 1, wherein the first polymerisation stage of step A) is effected in the optional further presence of chain transfer agent C2 having a water solubility of at most 0.5 g/L, wherein the concentration of chain transfer agent C2 having a water solubility of at most 0.5 g/L in the first polymerisation stage of step A) is at most 75 mole-%, relative to the total molar concentration of chain transfer agent C1 and chain transfer agent C2 present in the first polymerisation stage of step A).

5. The process according to claim 1, wherein the concentration of chain transfer agent C1 having a water solubility of at least 5 g/L in the second polymerisation stage of step A) is at most 10 mole-%, relative to the total molar concentration of chain transfer agent C1 and chain transfer agent C2 present in the second polymerisation stage of step A).

6. The process according to claim 1, wherein the chain transfer agent C1 is selected from the group consisting of 3-mercaptopropionic acid, 2-mercaptoethanol and any mixture thereof.

7. The process according to claim 1, wherein the chain transfer agent C2 is selected from the group consisting of isooctyl thioglycolate, lauryl mercaptan and any mixture thereof.

8. The process according to claim 1, wherein the chain transfer agent C1 is 3-mercaptopropionic acid.

9. The process according to claim 1, wherein the chain transfer agent C2 is lauryl mercaptan.

10. The process according to claim 1, wherein the weight ratio of the monomer composition A1 used in the first stage of step A) relative to the monomer composition A2 used in the second stage of step A) is from 10:90 to 60:40.

11. The process according to claim 1, wherein step A) consists of a first polymerisation stage of monomer composition A1 effected in the presence of a chain transfer agent C1 having a water solubility of at least 5 g/L and a subsequent second polymerisation stage of monomer composition A2 effected in the presence of a chain transfer agent C2 having a water solubility of at most 0.5 g/L.

12. The process according to claim 1, wherein the glass transition temperature of Polymer A is from 50 to 150° C., and the glass transition temperature of Polymer B is from −50 to 50° C., wherein the glass transition temperature is determined by calculation according to the Fox equation.

13. The process according to claim 1, wherein the glass transition temperature of Polymer B is at least 30° C. lower than the glass transition temperature of Polymer A, wherein the glass transition temperature is determined by calculation according to the Fox equation.

14. The process according to claim 1, wherein monomer composition A1 and A2 comprise the following monomers:
  Ai) from 5 to 15 wt. % of at least one carboxylic acid functional olefinically unsaturated monomer;
  Aii) from 85 to 95 wt. % of at least one olefinically unsaturated monomer different than Ai);
  Aiii) optionally at least one wet adhesion promoting olefinically unsaturated monomer different than Ai and Aii), in an amount of at most 6 wt. %; and
  Aiv) optionally at least one olefinically unsaturated monomer comprising crosslinkable groups, different than Ai), Aii) and Aiii), in an amount of at most 10 wt. %, wherein
  the amounts are given relative to the total weight of monomer composition A1 charged in the first polymerisation stage of step A) respectively relative to the total weight of monomer composition A2 charged in the second polymerisation stage of step A) and wherein the summed amount of Ai), Aii), Aiii) and Aiv) is 100 wt. %.

15. The process according to claim 1, wherein the monomer composition B comprises the following monomer(s):
  Bi) from 87 to 100 wt. % of at least one olefinically unsaturated monomer;
  Bii) optionally carboxylic acid functional olefinically unsaturated monomer, different than Bi), in an amount of at most 3 wt. %;
  Biii) optionally olefinically unsaturated monomer with wet adhesion promoting groups, different than Bi) and Bii), in an amount of at most 5 wt. %; and
  Biv) optionally olefinically unsaturated monomer comprising crosslinkable groups, different than Bi), Bii) and Biii), in an amount of at most 5 wt. %; wherein
  the amounts are given relative to the total weight of monomer composition B charged in step B) and wherein the summed amount of Bi), Bii), Biii) and Biv) is 100 wt. %.

16. The process according to claim 1, wherein Polymer A has an acid value of from 30 to 130 mg KOH/g of solid Polymer A, and Polymer B has an acid value lower than 25 mg KOH/g of solid Polymer B.

17. The process according to claim 1, wherein polymer B has a weight average molecular weight (Mw) at least 100,000 Dalton, and Polymer A has a weight average molecular weight (Mw) lower than 100,000 Dalton.

18. The process according to claim 1, wherein the carboxylic acid functional olefinically unsaturated monomers Ai) and if present Bii) are methacrylic acid.

19. The process according claim 1, wherein the monomers Aii) and Bi) are selected from the group consisting of acrylates, methacrylates, arylalkylenes and any mixture thereof.

20. The process according to claim 2, wherein the concentration of chain transfer agent C1 in the first polymerisation stage of step A) is from 0.4 to 1.3 wt.%, relative to the monomer composition A1 charged in the first stage of step A.

21. The process according to claim 3, wherein the concentration of chain transfer agent C2 in the second polymerisation stage of step A) is from 1 to 2 wt.%, relative to the monomer composition A2 charged in the second stage of step A.

22. The process according to claim 4, wherein the concentration of chain transfer agent C2 having a water solubility of at most 0.5 g/L in the first polymerisation stage of step A) is at most 50 mole-%, relative to the total molar concentration of chain transfer agent C1 and chain transfer agent C2 present in the first polymerisation stage of step A).

23. The process according to claim 4, wherein the concentration of chain transfer agent C2 having a water solubility of at most 0.5 g/L in the first polymerisation stage of step A) is at most 25 mole-%, relative to the total molar concentration of chain transfer agent C1 and chain transfer agent C2 present in the first polymerisation stage of step A).

24. The process according to claim 12, wherein the glass transition temperature of Polymer A is from 80 to 150° C. and the glass transition temperature of Polymer B is from −50 to 35° C.

25. The process according to claim 12, wherein the glass transition temperature of Polymer A is from 90 to 125° C. and the glass transition temperature of Polymer B is from −30 to 25° C.

26. The process according to claim 13, wherein the glass transition temperature of Polymer B is at least 40° C. lower than the glass transition temperature of Polymer A.

27. The process according to claim 16, wherein Polymer A has an acid value of from 35 to 100 mg KOH/g of solid Polymer A, and Polymer B has an acid value of at most 10 mg KOH/g of solid Polymer B.

28. The process according to claim 16, wherein Polymer A has an acid value of from 45 to 85 mg KOH/g of solid Polymer A, and Polymer B has an acid value of less than 5 mg KOH/g of solid Polymer B.

29. The process according to claim 28, wherein Polymer B has an acid value of 0 mg KOH/g of solid Polymer B.

30. The process according to claim 17, wherein Polymer B has a weight average molecular weight (Mw) higher than 150,000 Dalton, and Polymer A has a weight average molecular weight (Mw) from 10,000 to 70,000 Dalton.

31. The process according to claim 17, wherein Polymer B has a weight average molecular weight (Mw) higher than 200,000 Dalton, and Polymer A has a weight average molecular weight (Mw) from 15,000 to 70,000 Dalton.

32. An aqueous binder composition obtained by the process according to claim 1.

33. An aqueous binder composition comprising polymer particles dispersed in an aqueous medium, wherein the polymer particles comprise, based on the weight of the polymer particles:
  (a) from 5 to 95 wt.% of an at least partly deprotonated carboxylic acid-functional vinyl polymer (Polymer A) with a glass transition temperature higher than 50° C. and comprising as polymerized units:
    Ai) at least partly deprotonated carboxylic acid functional olefinically unsaturated monomer(s), and Aii) olefinically unsaturated monomer(s) different than Ai); and
(b) from 95 to 5 wt.% of vinyl Polymer B having a glass transition temperature equal to or lower than that of Polymer A and comprising as polymerized units;
Bi) olefinically unsaturated monomer(s); and
Bii) optionally carboxylic acid functional olefinically unsaturated monomer(s) different than Bi); wherein
the weight average molecular weight (Mw) of Polymer B is higher than the weight average molecular weight (Mw) of Polymer A; wherein
the glass transition temperature is determined by calculation by means of the Fox equation; and wherein
a part of Polymer A further comprises chain transfer agent C1 as functional end groups and a part of Polymer A comprises chain transfer agent C2 as functional end groups, wherein the water solubility of the chain transfer agent C1 is at least 5 g/L and the water solubility of chain transfer agent C2 is at most 0.5 g/L.

34. The aqueous binder composition according to claim 33, wherein the total amount of Polymer A and Polymer B is at least 25 wt.%, relative to the total weight amount of binders in the aqueous binder composition.

35. An aqueous coating composition comprising the aqueous binder composition according to claim 33.

36. The aqueous coating composition according to claim 35, wherein the coating composition further comprises at least one associative thickening agent in an amount of from 0.5 to 2.0 pbhp of binder.

37. A method of protectively coating a substrate comprising the steps of:
(1) applying the aqueous coating composition from claim 35 to a substrate to form a coating thereon, and
(2) drying the coating.

38. The method according to claim 37, wherein step (1) is practiced by spraying the aqueous coating composition onto the substrate.

* * * * *